United States Patent [19]
Gross

[11] Patent Number: 5,152,711
[45] Date of Patent: Oct. 6, 1992

[54] MAGNETIC TOY HAVING SCULPTURABLE PARTICLES

[76] Inventor: Louis Gross, 18143 Napa St., Northridge, Calif. 91325

[21] Appl. No.: 528,869

[22] Filed: May 23, 1990

[51] Int. Cl.⁵ .................. A63H 33/26; A63H 33/04; H01F 7/02; H01F 7/20
[52] U.S. Cl. ..................... 446/139; 446/92; 446/71; 335/285; 335/302; 335/306; 211/69.1; 211/69.5
[58] Field of Search ............... 211/69.1, 69.5, 69.6, 211/69.7; 446/71, 72, 92, 85, 129, 131, 133, 134, 135, 137, 139; 434/301; 335/285, 286, 287, 302, 306; 273/1 M, 126 A, 1 GD

[56] References Cited

U.S. PATENT DOCUMENTS

| | | | |
|---|---|---|---|
| 1,535,035 | 4/1925 | Philipp | 446/92 |
| 2,414,653 | 1/1947 | Lookholder | 335/285 |
| 2,455,506 | 12/1948 | Leslie | 335/285 |
| 2,457,421 | 12/1948 | Warren | 273/345 X |
| 2,614,362 | 10/1952 | Zavala | 446/129 |
| 2,767,517 | 10/1956 | Hooper | 446/139 |
| 2,812,203 | 11/1957 | Scholten | 335/302 X |
| 2,884,698 | 5/1959 | Würsch | 335/285 X |
| 2,890,090 | 6/1959 | Olson | 211/69.7 X |
| 2,958,019 | 10/1960 | Scholten et al. | 335/285 |
| 3,031,799 | 5/1962 | Bradsby | 335/285 X |
| 3,077,696 | 2/1963 | Barney et al. | 446/92 |
| 3,120,216 | 2/1964 | Meinhardt | 335/285 X |
| 3,196,566 | 7/1965 | Littlefield | 335/306 X |
| 3,200,507 | 8/1965 | Rivard | 335/285 X |
| 3,206,657 | 9/1965 | Moriva | 335/285 X |
| 3,714,612 | 12/1973 | Kayle | 446/129 X |
| 3,906,658 | 9/1975 | Gross | 446/92 |
| 4,154,019 | 5/1979 | Neuhierl | 446/129 |
| 4,382,245 | 5/1983 | Harrigan | 335/306 |
| 4,486,729 | 12/1984 | Lee | 335/306 |
| 4,543,551 | 9/1985 | Petersen | 335/302 X |
| 4,643,604 | 2/1987 | Enrico | 211/69.5 X |
| 4,679,022 | 7/1987 | Miyamoto et al. | 335/306 X |
| 4,964,830 | 10/1990 | Wagner | 446/71 |

FOREIGN PATENT DOCUMENTS

| | | | |
|---|---|---|---|
| 126414 | 6/1928 | Switzerland | 211/69.6 |
| 380267 | 9/1932 | United Kingdom | 211/69.6 |

Primary Examiner—David N. Muir
Attorney, Agent, or Firm—Poms, Smith, Lande & Rose

[57] ABSTRACT

A magnetic toy is disclosed which uses two magnetic structures and a magnetic platform plate to allow the toy user to create a wide variety of designs from magnetic particles. The two magnetic structures are arranged so that the same magnetic polarity for each structure is adjacent to the platform plate. This feature allows the magnetic particles to be formed in either bridging designs or divergent, stand-alone designs.

22 Claims, 3 Drawing Sheets

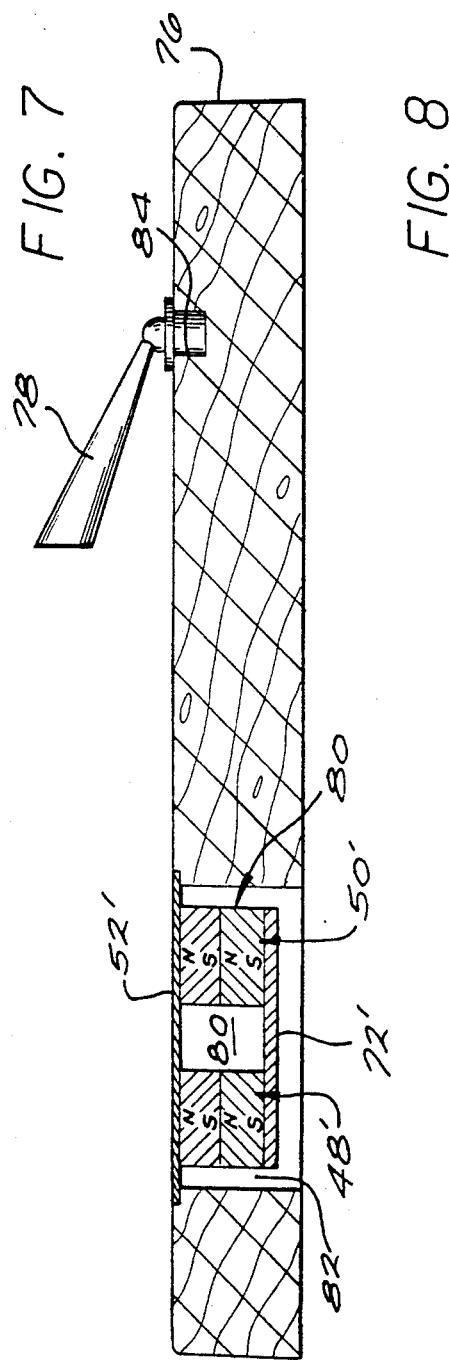
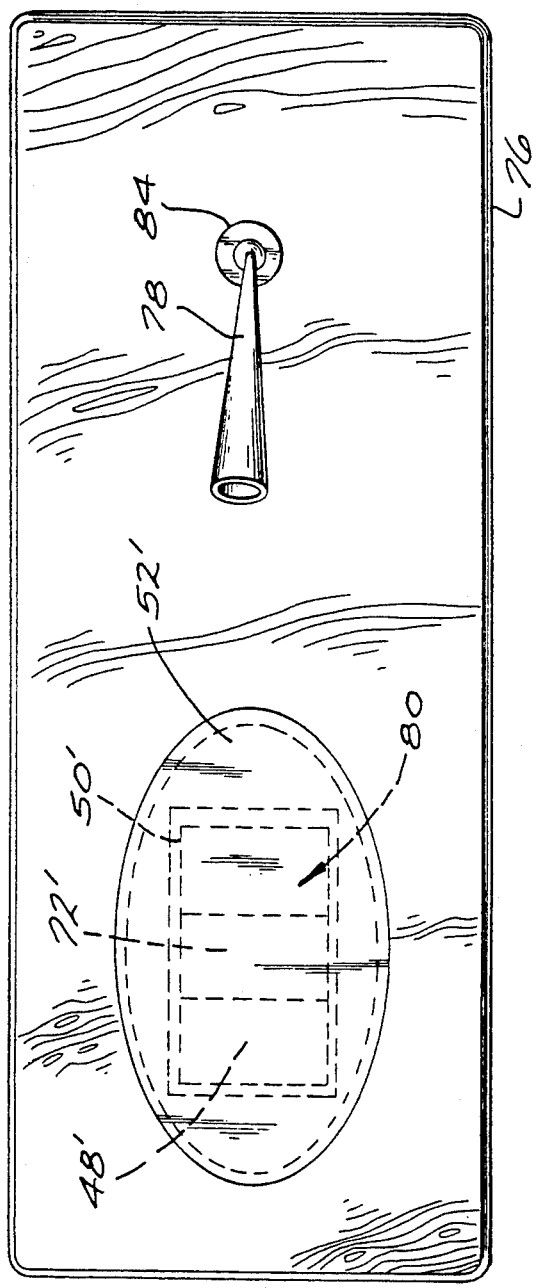

MAGNETIC TOY HAVING SCULPTURABLE PARTICLES

1. FIELD OF INVENTION

This invention relates to a magnetic toy, and more particularly to a magnetic toy which utilizes a magnetic circuit which allows the user to create a wide variety of divergent and bridging designs from magnetic particles on the top surface of the toy.

2. BACKGROUND OF THE INVENTION

It is well known to use permanent magnet structures in order to retain various ferrous objects such as paper clips and pins. More particularly, it is also known in the art to enclose a magnetic structure within a housing to allow a user to create various designs from individual magnetic particles on the housing.

For example, Jerry P. Kayle, U.S. Pat. No. 3,714,612, issued Jan. 30, 1973, discloses a magnetic toy by which a user may erect various bridging designs from small magnetic particles on a platform of the toy. The small magnetic particles are held together by magnetic forces created by a single two-pole permanent magnet within the toy. The toy further includes two magnetic pole pieces which are each juxtapositioned against one side of the permanent magnet. The two magnetic pieces extend up along the sides of the permanent magnet and then bend at a right angle and extend outward to form two semi-circular platforms for the toy. A strip of non-magnetic material between the two semi-circular platforms creates an air gap in the magnetic circuit. Therefore, the magnetic particles tend to form a bridging design between the two magnetic pieces. It is further noted that the extension of the magnetic pole pieces along the side of the permanent magnet between the north and south poles of the permanent magnet shunts the magnetic field and weakens the magnetic field for the toy of the Kayle patent.

Another magnetic toy is disclosed in Sam Gross, U.S. Pat. No. 3,906,658, granted Sep. 23, 1975. The Gross patent also teaches a magnetic toy which may be used to create bridgelike designs from magnetic particles on a platform of the toy. Gross, however, uses two bi-polar permanent magnet structures and a magnetic bar to form a U-shaped magnetic circuit. The two magnetic structures are arranged so that each structure has an opposite pole adjacent the platform of the toy. The magnetic particles thus seek to follow the magnetic field, which allows a bridgelike design to be held in place by magnetic forces.

The above-cited prior art references, however, do not disclose a magnetic toy in which an increased percentage of the surface area of the toy platform is in contact with the magnetic structures so as to create a strong magnetic field on the toy platform. Furthermore, the above-cited references do not disclose a magnetic toy which produces a high strength magnetic field which can support both bridging and non-bridging, divergent designs.

3. SUMMARY OF THE INVENTION

One object of the present invention is to provide a magnetic toy with which bridging and divergent designs may be formed from magnetic particles.

A further object of the invention is to provide a decorative pen holder and magnetic toy combination.

A still further object of the invention is to provide a decorative pen holder and magnetic toy combination which utilizes various shaped magnetic particles to form bridging and divergent designs.

These and other objects of the present invention are achieved through the use of two bi-polar permanent magnetic structures and a magnetic platform plate, the polarity of the magnets being such that a strong magnetic field is provided which will support both bridging and non-bridging, divergent structures. This may be accomplished by having both permanent magnet structures with the same magnetic pole adjacent to or engaging the platform plate.

In another embodiment of the invention a single bipolar permanent magnetic structure is disposed so as to have one magnetic polarity adjacent a magnetic platform plate. The area of the single magnetic structure adjacent to the plate covers more than one-quarter of the plate and extends to the immediate proximity of at least two different edges of the magnetic plate.

Advantages of the invention include the provision of a powerful magnetic field over the entire surface of a platform plate, and versatility permitting the construction of either divergent or bridging magnetic structures.

These and other objects of the present invention will now become apparent from a review of the drawings and the following description of the preferred embodiments.

4. BRIEF DESCRIPTION OF THE DRAWINGS

FIG. 7 is a cross-sectional view of the combination pen holder and magnetic toy of FIG. 6 taken along line 7—7 of FIG. 6.

FIG. 8 is a top view of the combination pen holder and magnetic toy of FIG. 6.

5. DETAILED DESCRIPTION

Figure 1:
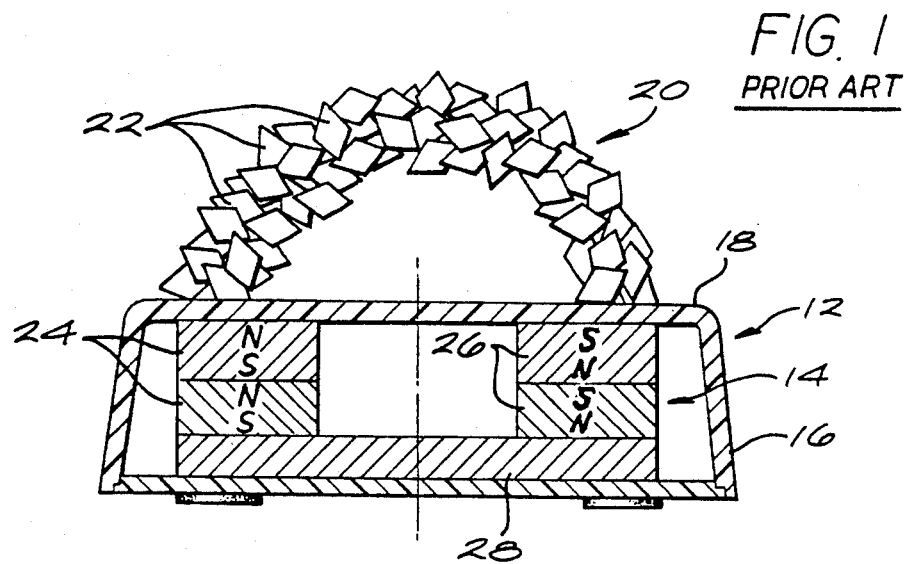
FIG. 1 is a cross-sectional view of a prior art magnetic toy which utilizes two magnetic structures with a bridging design built thereon.

FIG. 1 demonstrates one version of the prior art magnetic toy 12, as shown in U.S. Pat. No. 3/906,658 cited above. As shown in FIG. 1, a magnetic circuit 14 is enclosed within a housing 16. The housing 16 has a plastic platform surface 18 on which a bridging design 20 is supported. The bridging design 20 is sculpted from a plurality of magnetic particles 22. The magnetic circuit 14 is made up of a first and a second magnetic structures 24 and 26 and a magnetic bar 28. The first and second magnetic structures 24 and 26 are bipolar, with the polarity of the magnets shown in FIG. 1. As shown, the first magnetic structure 24 has the north pole adjacent the platform surface 18. The second magnetic structure 26 has the south pole adjacent the platform surface 18. The arrangement and polarity of the first and second magnetic structures, 24 and 26, and the magnetic bar 28 creates the effect of a U-shaped magnet. Thus, the magnetic particles 22 tend to form a bridging design 20 in order to complete the magnetic circuit. The magnetic circuit 14, however, will not support an extended upright or divergent sculpture; instead the magnetic particles 22 are attracted into a bridgelike design.

Figure 2:
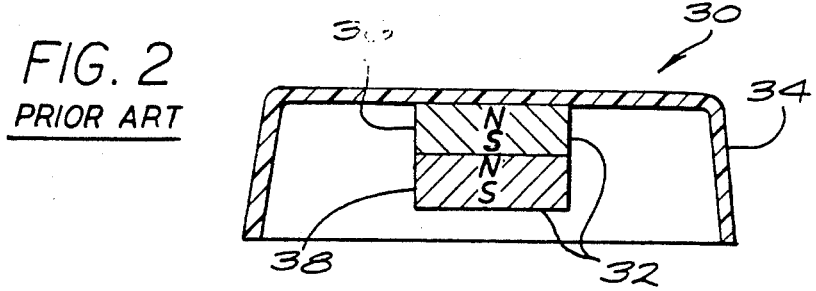
FIG. 2 is a cross-sectional view of another prior art magnetic toy which utilizes a single magnetic structure.

Referring now to FIG. 2, another embodiment 30 of a prior art magnetic toy is shown. In this embodiment 30, a magnetic structure 32 is enclosed within a housing 34. The magnetic structure 32 is comprised of a first square magnet 36 stacked on top of a second magnet 38. The first and second magnets 36 and 38 are bipolar, as shown in FIG. 2. The magnetic field created by the magnetic structure 32 is concentrated over the magnet 36, and is relatively weak so that complex or interesting structures cannot be formed.

Figure 3:
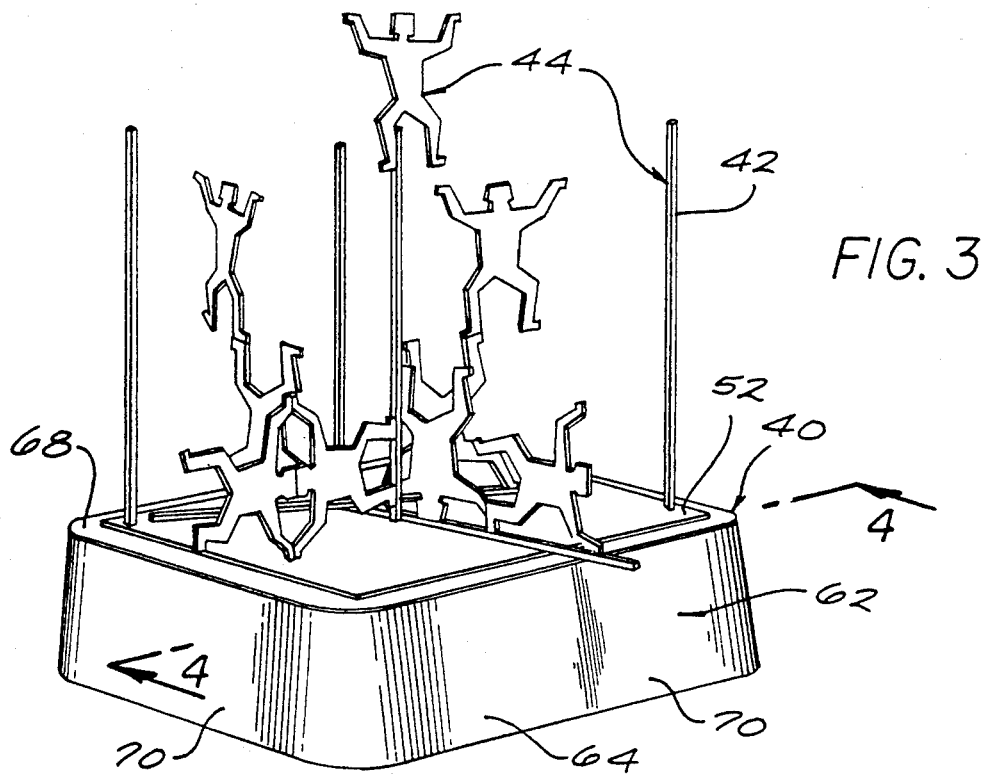
FIG. 3 is a perspective view of a first embodiment of a magnetic toy illustrating the principles of this invention, with a non-bridging design built thereon.
Figure 4:
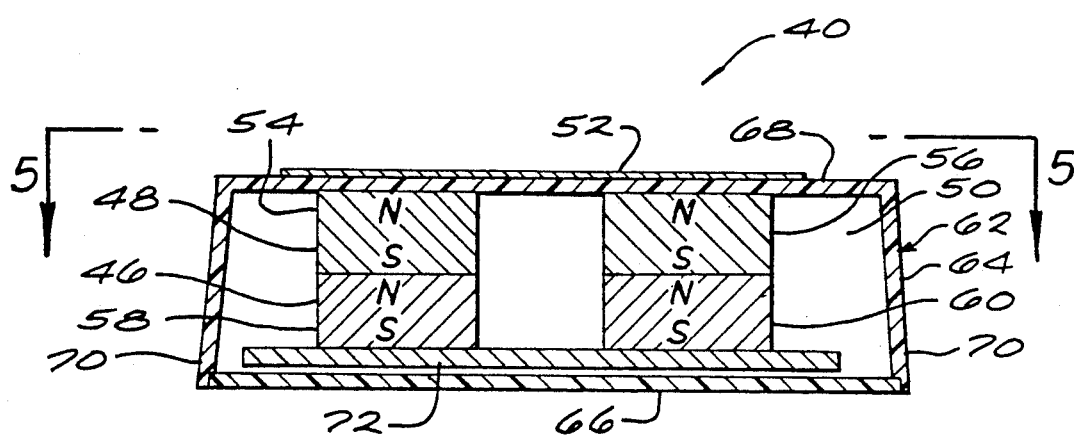
FIG. 4 is a cross-sectional view of the magnetic toy of FIG. 3, taken along line 4—4 of FIG. 3.

Referring now to FIG. 3, a first embodiment of the magnetic toy 40 of the present invention is shown. As shown in FIG. 3, the magnetic toy 40 provides a strong broad field, and is capable of supporting non-bridging, divergent designs 42 from the magnetic particles 44. The capability of supporting non-bridging designs is a result of a magnetic circuit assembly 46 best shown in FIG. 4. As seen in FIG. 4, the magnetic circuit 46 is comprised of a first magnetic structure 48, a second magnetic structure 50 and a magnetic platform plate 52. In the preferred embodiment shown, the first and second magnetic structures 48 and 50 are each comprised of a pair of magnets. Therefore, the first magnetic structure 48 is further comprised of a first upper magnet 54 and a first lower magnet 58. The first upper magnet 54 is stacked on top of and axially aligned with the first lower magnet 58. Similarly, the second magnetic structure 50 is further comprised of a second upper magnet 56 and a second lower magnet 60. The second upper magnet 56 is stacked on top of and axially aligned with the second lower magnet 60.

Figure 6:
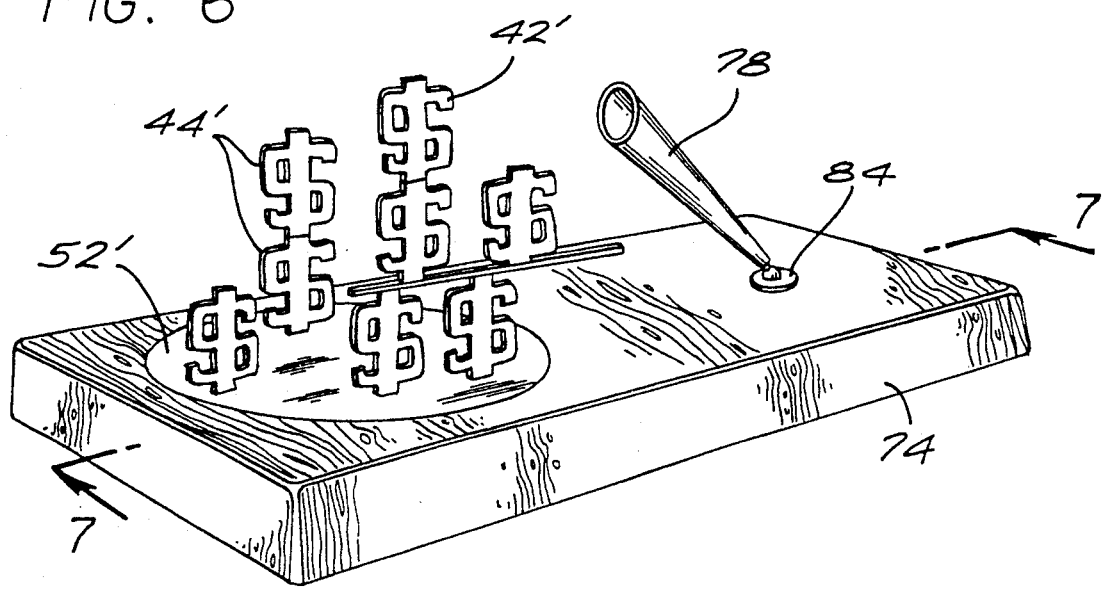
FIG. 6 is a perspective view of a combination pen holder and magnetic toy, illustrating the invention, with a non-bridging design built thereon.

An important feature of the magnetic circuit 46 is the polarity arrangement of the first and second magnetic structures 48 and 50. Both magnetic structures 48 and 50 are arranged so that each structure has the same magnetic pole adjacent or engaging the platform plate 52. For example, as shown in FIG. 4, both the first and the second magnetic structures 48 and 50 are arranged so that the north poles of the magnetic structures are adjacent the platform plate 52. The combination of this polarity arrangement and the magnetic platform plate 52 allows various non-bridging, divergent designs, as well as bridging designs, to be built on the magnetic toy 40 with the magnetic particles 44. These design possibilities are shown in FIGS. 3 and 6. For example, as shown in FIG. 3, a divergent structure 42 built from various-shaped magnetic particles 44 will be supported by the toy 40. As shown in FIGS. 3 and 6, the magnetic particles 44 will also stand upright at the outer edges of the platform plate 52.

The magnetic platform plate 52 forms a broad and strongly magnetized, substantially planar surface for the magnetic toy 40. The magnetic platform plate 52 is magnetically energized by the first and second magnetic structures 48 and 50, to provide a large area surface across the entire surface of which, magnetic structures may be built or held. As shown in FIG. 4, the first and second magnetic structures 48 and 50 are substantially parallel to each other and spaced apart so as to be located at opposing sides of the platform plate 52.

Figure 5:
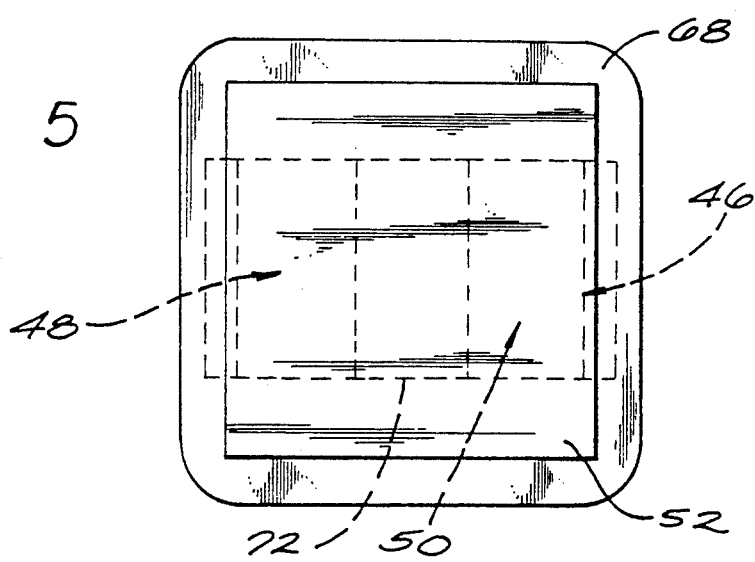
FIG. 5 is a top view of the magnetic toy of FIGS. 3 and 4, as indicated at line 5—5 in FIG. 4.

Referring now to FIG. 5, the total surface area of the top surfaces of the first and second magnetic structures 48 and 50 adjacent to the platform plate 52 is shown. As seen in FIG. 5, the total surface area of the first and second magnetic structures 48 and 50 covers an area of at least one-quarter of the surface area of the platform plate 52. As a result of the increased magnetic surface area, the magnetic field available to the platform plate 52 is substantially stronger than the magnetic fields created in the prior art. The stronger magnetic field allows the user to build divergent and more complex designs out of the magnetic particles 44.

The magnetic structures 48 and 50 are enclosed within a plastic housing 62. The housing 62 includes a cover portion 64 and an optional base plate 66. The housing 62 has a substantially planar upper surface 68 and a plurality of sidewalls 70. The sidewalls 70 extend downward from the perimeter of the substantially planar surface 68. The optional base plate 66 is in contact with and attached to the sidewalls 70 at the lower edge of the sidewalls 70. The base plate 66 is substantially planar to allow the housing 62 to rest on a flat surface such as a desk. Therefore, as best seen in FIG. 4, the cover 64 and the base 66 enclose the magnetic structures 48 and 50. The platform plate 52 is bonded in planar contact to the substantially planar surface 68 of the housing cover 64.

As an option, the magnetic circuit 46 may further include a magnetic bar 72. The magnetic bar 72 is magnetically attracted to the first and second magnetic structures 48 and 50 at the opposite end of the structures from the platform plate 52. Therefore, the magnetic bar 72 connects the first and the second magnetic structures 48 and 50 at the lower end of the structures. The magnetic bar or plate 72 is not essential as it connects the two magnetic poles of the same polarity, and thus, does not complete a magnetic circuit, as in the case of the bar 28 in the structure of FIG. 1.

Referring now to FIGS. 6, 7 and 8, a combination pen holder and magnetic toy 14 is shown. The combination pen holder and magnetic toy 74 is comprised of a base or housing 76, means for holding a pen in a stable upright position 78, and a magnetic circuit assembly 80 for forming a structure from the magnetic symbols 44' on a top surface of the housing or base 76. As seen in FIG. 6, the pen holding means 78 may consist of a standard desk-top pen holder. The magnetic circuit 80 is similar to the magnetic circuit 46 used in the magnetic toy 40 described above. The base or housing 76 is preferably constructed from a decorative wood material for this embodiment of the invention.

Referring now to FIG. 7, it can be seen that the base 76 includes a first cavity 82 and a second cavity 84. The first cavity 82 provides a recess in the housing 76 in which a first and second magnetic structures 48' and 50' are contained. The magnetic circuit 80 is pre-assembled before the circuit 80 is used within the combination pen holder and magnetic toy 74. In the pre-assembly of the magnetic circuit 80' the first and second magnetic structures 48' and 50' are mounted to a magnetic platform plate 52' so that the top surfaces of the first and second magnetic structures 48' and 50' are in direct contact with the platform plate 52'. If an optional magnetic bar 72' is used in the magnetic circuit 80, the bar 72' is mounted to the magnetic structures 48' and 50' at the lower end of the structures 48' and 50'. The magnetic circuit 80 is then inserted into the first cavity 82 so that the platform plate 52' fits into a slight recess 86 in the top surface of the base 76. Therefore, the platform plate 52' lies flush with the top surface of the base 76. The second cavity 84 provides a recess in the base 76 in which the pen holding means 78 is mounted.

Referring now to FIG. 8, the platform plate 52' is shown to be a substantially oval shape. The platform plate 52' may be of any desired shape. Also, the base 76 may be fabricated from any desirable non-magnetic material. The magnetic platform plate 52' is preferably glued or bonded to the base 76, thus supporting the magnetic circuit assembly 80.

For completeness specific dimensions of one illustrative embodiment of the invention will be given. Thus, the embodiment of FIGS. 3–5 includes a molded plastic base which is approximately four inches square at its base and approximately three and five-eighth inches square at its top, which is about one inch high. The platform plate is three inches square, formed of chromium plated steel. The magnetic particles, in the form of acrobats and thin rods of square cross section, are formed of nickel plated steel stampings, and nickel plated lengths of square steel wire, respectively. The permanent magnets are high strength ceramic magnets having a shape which is three-eighth inch thick by one inch by one and one-quarter inch. The area of the permanent magnets adjacent the platform plate is about 2.5 square inches or about 27.7 percent of the area of the platform plate, which is about nine square inches in area. The permanent magnets have a high magnetic field strength sufficient for each magnet to repel and overcome the force of gravity of an identical oppositely pole oriented magnet at a vertical spacing of the two magnets of about one and one-half inches. It is to be understood that the invention is not limited to these dimensions, or specific properties or materials, but that such information is provided for complete disclosure of one preferred embodiment of the invention.

In another embodiment of the invention a single permanent magnetic structure is utilized. The single magnetic structure is preferably an annular-shaped bipolar magnet with an outer diameter of 3.2 inches and an inner diameter of 1.6 inches. The single magnetic structure is also preferably 0.5 inch thick. The magnetic platform used in this embodiment is preferably three inches square in surface area. The single magnetic structure has one magnetic pole adjacent the platform plate. The total surface area of the single magnetic structure adjacent the plate covers more than fifty percent of the surface area of the platform plate. Furthermore, the surface area of the magnetic structure adjacent the platform plate extends to the immediate proximity of at least two different edges of the platform plate.

As an alternative in the above described embodiment, the annular-shaped single magnetic structure may have an outer diameter of approximately 2.8 inches and an inner diameter of 1.4 inches. The total surface area of this single magnetic structure adjacent the platform plate covers approximately one-half of the surface area of the platform plate. This single magnetic structure is preferably five-eighth inch thick. The annular-shaped single magnetic structure of either of these dimensions will provide a powerful magnetic field of one polarity capable of supporting divergent or bridging designs.

It is desirable that the entire magnetic platform plate be strongly magnetized with a single magnetic polarity, and in this connection it is desirable that the permanent magnet structure extend to the immediate proximity of the edges of the platform plate. In the embodiment of FIGS. 3, 4 and 5, the upper surface of the magnets is within one-half inch of all edges of the three inch square platform plate and in the embodiment of FIGS. 7 and 8 the corners of the magnets are with one-quarter to three-eighth inch of the edge of the oval plate which is about three inches long. Similarly, when a single annular permanent magnet is used, the outer edges of the magnet are within one-quarter inch of the edges of the plate. In general, when the phrase "in immediate proximity" of the edges of the plate is used in the present specification and claims, it means that the permanent magnet structure extends close to the edges of the plate within fifteen percent or twenty percent of the maximum length of the platform plate.

Having thus described exemplary embodiments of the present invention, it should be noted by those skilled in the art that the within disclosures are exemplary only and that various other alternatives, adaptations and modifications may be made within the scope of the invention. Thus, by way of example, but not of limitation, the magnetic particles 44 may be shaped as human figures as shown in FIG. 3, or as dollar signs as shown in FIG. 6. Alternatively, the pen holding means 78 shown in FIG. 6 may be substituted with any other desirable desk accessory. Accordingly, it is to be understood that the present invention is not limited to the precise construction as shown in the drawings and described herein above.

I claim:

1. A versatile magnetic toy comprising:
    a non-magnetic housing, said housing having a substantially planar top surface;
    a first permanent magnet structure disposed within said housing;
    a second permanent magnet structure substantially parallel and in a spaced relation to said first magnet structure, said second magnet structure also disposed within said housing;
    a magnetic platform plate, said plate lying in planar contact with said top surface of said housing and further wherein said first and second permanent magnet structures have the same magnetic pole adjacent said platform plate;
    a plurality of magnetic particles for forming a design from said particles on said platform plate;
    whereby, a powerful magnetic field of one polarity is provided to support divergent or bridging structures.

2. A magnetic toy in accordance with claim 1 wherein said housing further comprises:
    a cover, said cover comprising said substantially planar top surface of said housing and a plurality of side walls extending downward from the perimeter of said top surface; and
    a base, said base being substantially planar and attached to said cover at the lower end of said side walls of said cover.

3. A magnetic toy in accordance with claim 1 wherein said first magnetic structure is comprised of a first upper magnet and a first lower magnet, said first upper magnet being stacked on top of and axially aligned with said first lower magnet such that both said first upper magnet and said first lower magnet have the same polarity facing in the same direction.

4. A magnetic toy in accordance with claim 1 wherein said second magnetic structure is comprised of a second upper magnet and a second lower magnet, said second upper magnet being stacked on top of and axially aligned with said second lower magnet such that both said second upper magnet and said second lower magnet have the same polarity facing in the same direction.

5. A magnetic toy in accordance with claim 1 wherein said substantially planar surface of said housing has an aperture defined therein, and in which said platform plate is in direct contact with said first and said second magnetic structures.

6. A magnetic toy in accordance with claim 1 further comprising a magnetic bar, said bar being magnetically attracted to and connecting said first and said second magnetic structures at the opposite ends from said platform plate.

7. A magnetic toy in accordance with claim 1 wherein said magnetic particles are configured in various shapes.

8. A magnetic toy in accordance with claim 1 wherein said housing is plastic.

9. A magnetic toy in accordance with claim 1 wherein said housing is constructed from a decorative wood material.

10. A magnetic toy as defined in claim 1 said magnetic platform extends over the greater portion of the upper surface of said housing.

11. A decorative apparatus for holding a pen comprising:
   a housing, said housing having a substantially planar top surface;
   means for holding the pen in a stable upwardly extending position, said pen holding means mounted in said housing;
   a first permanent magnet structure disposed within said housing;
   a second permanent magnet structure substantially parallel and in a spaced relation to said first magnet structure, said second magnet structure also disposed within said housing;
   a magnetic platform plate, said plate lying along substantially the same plane as said top surface of said housing and further wherein said first and said second magnet structures have the same magnetic pole adjacent said platform plate; and
   a plurality of magnetic particles for forming a design from said particles on said platform plate.

12. A decorative apparatus for holding a pen in accordance with claim 11 wherein said housing is comprised of a wooden block, said wooden block having a first cavity defined within to contain said first and said second magnetic structures.

13. A decorative apparatus for holding a pen in accordance with claim 11 wherein said housing further defines a second cavity within which said pen holding means is mounted.

14. A decorative apparatus for holding a pen in accordance with claim 11 wherein said first magnet structure is comprised of a first upper magnet and a first lower magnet, said first upper magnet being stacked on top of and axially aligned with said first lower magnet such that both said first upper magnet and said first lower magnet have the same polarity facing in the same direction.

15. A decorative apparatus for holding a pen in accordance with claim 11 wherein said second magnet structure is comprised of a second upper magnet and a second lower magnet, said second upper magnet being stacked on top of and axially aligned with said second lower magnet such that both said second upper magnet and said second lower magnet have the same polarity facing in the same direction.

16. A decorative apparatus for holding a pen in accordance with claim 11 wherein said first cavity surface has a recess defined therein to allow said platform plate to lay flush with said substantially planar surface of said housing.

17. A decorative apparatus for holding a pen in accordance with claim 11 further comprising a magnetic bar, said bar being magnetically attracted to and connecting said first magnet structure and said second magnet structure at the opposite ends of the structures from said platform plate.

18. A decorative apparatus for holding a pen in accordance with claim 11 wherein said magnetic particles are configured in various shapes.

19. A decorative apparatus for holding a pen in accordance with claim 11 wherein said platform plate is substantially oval in shape.

20. A versatile magnetic toy comprising:
   a non-magnetic housing, said housing having a substantially planar top surface;
   a first permanent magnet structure disposed within said housing;
   a second permanent magnet structure substantially parallel and in a spaced relation to said first magnet structure, said second magnet structure also disposed within said housing;
   a magnetic platform plate, said plate lying in planar contact with said top surface of said housing and further wherein said first and second permanent magnet structures have the same magnetic pole adjacent said platform plate;
   the area of said first and second magnet structures adjacent said platform plate being at least equal to one-quarter of the area of said platform plate;
   a plurality of magnetic particles for forming a design from said particles on said platform plate; and
   whereby, a powerful magnetic field of one polarity is provided to support divergent or bridging structures.

21. A versatile magnetic toy comprising:
   a non-magnetic housing, said housing having a substantially planar top surface;
   a magnetic platform plate, said plate lying substantially along the top surface of said housing;
   a bipolar high strength permanent magnetic structure disposed within said housing and having a single magnetic polarity adjacent said plate and further wherein the area of said permanent magnetic structure adjacent said plate covers more than one-quarter of the area of said plate and extends to the immediate proximity of at least two different edges of said plate; and
   a plurality of magnetic particles for forming designs from said particles on said platform plate;
   whereby a powerful magnetic field of one polarity is provided to support divergent or bridging designs.

22. A versatile magnetic toy comprising:
   a non-magnetic housing, said housing having a substantially planar top surface;
   a magnetic platform plate, said plate lying substantially along the top surface of said housing,
   a bipolar high strength permanent magnetic structure disposed within said housing and having a cross-sectional configuration with identical magnetic poles adjacent said plate in at least two spaced zones in the immediate proximity of at least two different edges of said plate and further wherein the area of said permanent magnetic structure adjacent said plate covers more than one-quarter of the area of said plate; and a plurality of magnetic particles for forming designs from said particles on said platform plate;

whereby a powerful magnetic field of a single polarity is provided in said plate to support divergent or bridging designs.

* * * * *